US012572114B2

(12) United States Patent
Krellenstein

(10) Patent No.: US 12,572,114 B2
(45) Date of Patent: Mar. 10, 2026

(54) MECHANICAL CLOCK FOR USE IN FLUID MEDIA

(71) Applicant: Adam Gruen Krellenstein, Redding, CT (US)

(72) Inventor: Adam Gruen Krellenstein, Redding, CT (US)

( * ) Notice: Subject to any disclaimer, the term of this patent is extended or adjusted under 35 U.S.C. 154(b) by 440 days.

(21) Appl. No.: 18/174,311

(22) Filed: Feb. 24, 2023

(65) Prior Publication Data

US 2023/0324850 A1 Oct. 12, 2023

Related U.S. Application Data

(60) Provisional application No. 63/314,120, filed on Feb. 25, 2022.

(51) Int. Cl.
*G04B 1/26* (2006.01)

(52) U.S. Cl.
CPC .................................... *G04B 1/26* (2013.01)

(58) Field of Classification Search
CPC ........................................................ G04B 1/26
See application file for complete search history.

(56) References Cited

FOREIGN PATENT DOCUMENTS

GB 2448736 A * 10/2008 ............... G04F 1/08

* cited by examiner

*Primary Examiner* — Renee S Luebke
*Assistant Examiner* — Matthew Daniel Hwang
(74) *Attorney, Agent, or Firm* — Knobbe Martens Olson & Bear LLP

(57) ABSTRACT

A mechanical clock may include a platform with a bladder, a lower valve, an upper valve, and a compression device. The lower valve is in fluid communication with the bladder and a rare fluid source including a rare fluid. The bladder is also in fluid communication with the lower valve, and the upper valve is also in fluid communication with the bladder. A compression device is in contact with the bladder.

20 Claims, 6 Drawing Sheets

MECHANICAL CLOCK FOR USE IN FLUID MEDIA

BACKGROUND

Field

This disclosure relates to mechanical clocks.

Description of the Related Art

Mechanical clocks are useful timekeeping devices. However, there are significant problems existing mechanical clock designs. Accordingly, there is a need in the art for improved mechanical clocks.

SUMMARY

In some embodiments, a mechanical clock comprises a platform configured to move vertically in a fluid. The platform comprises a lower valve in fluid communication with a rare fluid source; a bladder in fluid communication with the lower valve; an upper valve in fluid communication with the bladder; and a compression device in contact with the bladder.

In some aspects, the techniques described herein relate to a mechanical clock including: a platform including: a bladder; a lower valve; an upper valve; and a compression device, wherein the lower valve is in fluid communication with the bladder and a rare fluid source, wherein the rare fluid source includes a rare fluid, wherein the bladder is in fluid communication with the lower valve, wherein the upper valve is in fluid communication with the bladder, and wherein a compression device in contact with the bladder.

In some aspects, the techniques described herein relate to a mechanical clock, further including a chamber including: one or more sides; an upper surface; and a lower surface, wherein the one or more sides may be open, wherein the upper surface and the lower surface may be open, and wherein the platform is disposed within the chamber.

In some aspects, the techniques described herein relate to a mechanical clock, wherein the upper valve is configured to open when the upper valve is in contact with the upper surface of the chamber, and wherein the lower valve is configured to open when the lower valve is in contact with the lower surface of the chamber.

In some aspects, the techniques described herein relate to a mechanical clock, wherein the rare fluid source includes a rare fluid vessel.

In some aspects, the techniques described herein relate to a mechanical clock, wherein the rare fluid source includes a pressurized vessel.

In some aspects, the techniques described herein relate to a mechanical clock, wherein the rare fluid source includes a pump.

In some aspects, the techniques described herein relate to a mechanical clock, wherein the lower valve and the upper valve are constant flow valves.

In some aspects, the techniques described herein relate to a mechanical clock, wherein the lower valve and upper valve are manually operated valves.

In some aspects, the techniques described herein relate to a mechanical clock, wherein the lower valve and upper valve are pressure-sensitive valves.

In some aspects, the techniques described herein relate to a mechanical clock, wherein the platform is mechanically coupled to one or more guide rails, wherein the one or more guide rails limit horizontal motion of the platform.

In some aspects, the techniques described herein relate to a mechanical clock, wherein the platform is at least partially encapsulated a shell.

In some aspects, the techniques described herein relate to a mechanical clock, wherein the one or more sides of the chamber are at least partially enclosed.

In some aspects, the techniques described herein relate to a mechanical clock, wherein the platform is negatively buoyant with respect to a fluid in which the platform is placed.

In some aspects, the techniques described herein relate to a mechanical clock, wherein the rare fluid includes air.

In some aspects, the techniques described herein relate to a mechanical clock, further including an indicator of an amount of elapsed time.

In some aspects, the techniques described herein relate to a mechanical clock, wherein the indicator is a display of elapsed time or current time.

In some aspects, the techniques described herein relate to a mechanical clock, wherein the platform is submerged in a dense fluid.

In some aspects, the techniques described herein relate to a mechanical clock, wherein the dense fluid includes water and the rare fluid includes air.

In some aspects, the techniques described herein relate to a mechanical clock including: a dense fluid source; and a platform including: an upper valve in fluid communication with the dense fluid source; a bladder in fluid communication with the upper valve; a lower valve in fluid communication with the bladder; and a compression device in contact with the bladder.

In some aspects, the techniques described herein relate to a method of keeping time, the method including: flowing a rare fluid into a bladder forming part of a platform and mechanically and fluidly coupled to a first valve and a second valve, wherein flowing the rare fluid makes the platform slightly positively buoyant; automatically opening the first valve when the bladder reaches a first height, wherein opening the first valve causes rare fluid to escape from the bladder, and wherein rare fluid escaping from the bladder causes the platform to become slightly negatively buoyant; once the platform has become slightly negatively buoyant, automatically closing the first valve; automatically opening the second valve when the bladder reaches a second height, wherein opening the second valve causes rare fluid to fill the bladder, and wherein rare fluid filling the bladder causes the platform to become slightly positively buoyant; and once the platform has become slightly positively buoyant, automatically closing the second valve.

In some aspects, the techniques described herein relate to a method, wherein automatically opening the first valve, automatically closing the first valve, automatically opening the second valve, and automatically closing the second valve are repeated for a plurality of iterations. 55169121

Various combinations of the above and below recited features, embodiments, and aspects are also disclosed and contemplated by the present disclosure.

Additional embodiments of the disclosure are described below in reference to the appended claims, which may serve as an additional summary of the disclosure.

BRIEF DESCRIPTION OF THE DRAWINGS

These and other features, aspects, and advantages of the disclosure are described with reference to drawings of certain embodiments, which are intended to illustrate, but not to limit, the present disclosure. It is to be understood that the accompanying drawings, which are incorporated in and constitute a part of this specification, are for the purpose of illustrating concepts disclosed herein and may not be to scale.

DETAILED DESCRIPTION OF CERTAIN EMBODIMENTS

Figure 1:
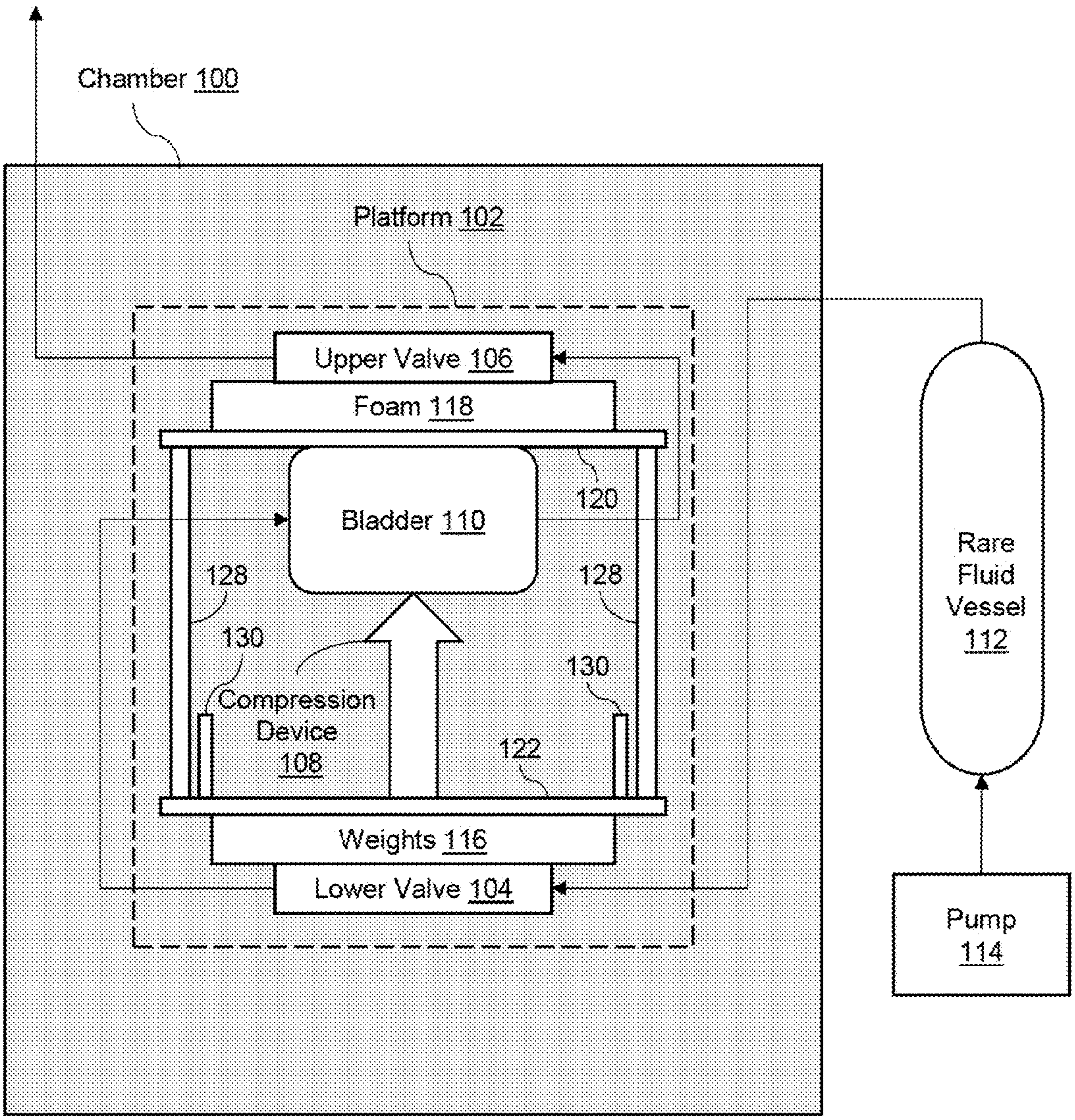
FIG. 1 illustrates a mechanical clock that may be used in fluids according to some embodiments.

Embodiments of the disclosure will now be described with reference to the accompanying figures. The terminology used in the description presented herein is not intended to be interpreted in any limited or restrictive manner, simply because it is being utilized in conjunction with a detailed description of embodiments of the disclosure. Furthermore, embodiments of the disclosure may include several novel features, no single one of which is solely responsible for its desirable attributes or essential to practicing the embodiments of the disclosure herein described. For purposes of this disclosure, certain aspects, advantages, and novel features of various embodiments are described herein. It is to be understood that not necessarily all such advantages may be achieved in accordance with any particular embodiment. Thus, for example, those skilled in the art will recognize that one embodiment may be carried out in a manner that achieves one advantage or group of advantages as taught herein without necessarily achieving other advantages as may be taught or suggested herein.

Mechanical clocks, such as those that utilize a pendulum or balance wheel, can provide timekeeping with desirable accuracy in some circumstances. However, in some environments, the behavior of a pendulum, balance wheel, and the like can diverge significantly from the behavior that would be predicted by applying the ordinary laws of classical mechanics. For example, in a rare (e.g., low density) fluid such as air, a pendulum or balance wheel behaves at least approximately as a simple harmonic oscillator only for small oscillations. In denser fluids, however, the viscosity of the fluid can cause the actual behavior of a pendulum or balance wheel to diverge significantly from the idealized behavior described by simple classical mechanical models.

The goal of many mechanical clocks is generally to produce a repeatable event that takes a set amount of time to complete even as the quantity of energy available to carry out the event decreases. Conventional mechanical clocks achieve this with small perturbations around a local minimum in the potential energy of the system. For example, for a pendulum oscillating about its equilibrium point, the restoring force on the pendulum is roughly linear with displacement angle, and the period of oscillation is approximately constant.

Typical mechanical clocks perform best in vacuum conditions but can be made to be sufficiently accurate for many applications so long as any fluid they're in (e.g., air) does not overly disrupt the operation of the mechanism. For example, the restoring force in a viscous fluid may depend on the speed of the mechanism, not only the displacement from equilibrium. The drag force on a pendulum may be, for example, linearly proportional to the speed of the pendulum. In air or another fluid of relatively low density, the drag effects of the rare fluid may be minimized (e.g., by aerodynamic design of a pendulum) such that a clock can still perform with sufficient accuracy for many applications. However, mechanical clocks may not perform acceptably when the surrounding fluid is so viscous that its effects cannot be ignored or effectively mitigated by altering the physical design of the clock mechanism.

Additional means of tracking the passage of time are also known. For example, water clocks measure the passage of time by regulating the flow of a liquid into or out of a vessel, and the amount of water that flowed into the vessel or out of the vessel can then be used to determine an amount of time that elapsed. Water clocks are, however, susceptible to variations due to changes in the viscosity of the liquid. Changes in viscosity of 10%, 20%, or more throughout a day may occur, leading to large errors in time tracking. For example, under typical conditions, a water clock could gain or lose several hours each day based on changes in the ambient temperature and the resulting changes in the viscosity of the water. An hourglass is another example of a clock that does not work as a simple harmonic oscillator. Hourglasses that use solid grains rather than liquids may offer advantages over water clocks and fluid-based hourglasses because they are less susceptible to environmental changes such as temperature variations. However, both water clocks and hourglasses are limited in that they cannot be used to track an indefinite amount of time. That is, they lack a repeatable event. A water clock will have to be refilled manually, and an hourglass will have to be turned once all the grains have fallen to the other side of the hourglass, allowing for only a single fixed period to be measured.

The clocks described previously all suffer from various limitations. Clocks that operate as simple harmonic oscillators can track arbitrary lengths of time, but they perform poorly when not used under vacuum or in a sufficiently rare fluid. Hourglasses and water clocks can't track arbitrary periods of time, and in some cases can be impacted significantly by environmental conditions. To overcome these issues, an oscillatory mechanical clock may be designed according to Aristotelian notions of natural motion to operate in dense fluids such as water, oil, and so forth so that arbitrary time ranges can be tracked in environments where a traditional pendulum-based clock would not provide accurate tracking.

Depending on the density of an object relative to the density of the surrounding fluid, an object may either rise or fall. When a body moves in a viscous medium under a constant force, its velocity may be low and of a constant value. Thus, it is possible to achieve periodic motion by, for example, varying the density of an object around a neutral buoyancy point (e.g., the point where the density of the object is the same as that of the surrounding fluid), where the fluid medium provides sufficient fluid resistance. For example, a bladder may be inflated with a rare fluid that is less dense than the surrounding fluid. In some cases, the two fluids may be of similar density, such as salt water and fresh water, or the two fluids may have very different densities. For example, air or another suitable gas may serve as a rare fluid, and the surrounding fluid may be a liquid such as water. Inflating and deflating the bladder can change its buoyancy in water or another dense fluid and thereby achieve periodic motion. Preferably, the path traveled by the bladder should be long and the speed of travel should be slow so that the time taken to change the direction of the bladder (e.g., by flowing in more air or releasing some amount of air), during which period the motion of the bladder is not constant, is small compared to the time it takes to travel over the path. That is, it may be preferable for a bladder or other body traveling in a dense medium to reach its terminal velocity (e.g., where the buoyant force balances the fluid resistance) quickly so that the body travels at a constant speed aside from a short interval when the object is changing directions. Thus, the buoyant force may preferably be very small so that the terminal velocity can be reached quickly.

Advantageously, a clock designed according to such principles may be constructed from simple components. For example, a bladder can be made out of any suitable flexible, impermeable membrane that can withstand the pressure difference inside and outside the bladder. Weights to give negative buoyancy and low density materials to give positive buoyancy can be common items such as lead weights or low-density foams. Springs and valves may be constructed from, for example, coiled metal and leather. Hoses to connect the various components can be readily acquired or even fashioned from animal intestines.

FIG. 1 depicts a clock design that may be used in a dense fluid. A platform 102 can include a lower valve 104, an upper valve 106, a compression device 108, a bladder 110, weights 116, and foam 118. The platform 102 can be submerged in a chamber 100 containing a dense fluid which may be, for example, water or air. The platform can include a lower valve 104 which, when open, allows a rare fluid from rare fluid vessel 112 to be pumped by the pump 114 into the bladder 110. The platform can include an upper valve 106 that, when open, allows the rare fluid to escape from the bladder 110. The compression device 108, which may be, for example, a spring, can push against the bladder 110 to cause some or all of the rare fluid to flow out of the bladder 110. In some embodiments, the platform 102 may have weights 116, foam 118, or both in order to change the buoyancy of the platform 102. In some embodiments, the platform 102 can include an upper rigid body 120 and a lower rigid body 122. For example, in some embodiments, compression device 108 can be secured to the lower rigid body 122 (e.g., by screwing, nailing, welding, epoxying, and so forth) such that it pushes the bladder 110 against the upper rigid body 120.

In some embodiments, the platform 102 can include linkages 128 that connect an upper portion of the platform 102 and a lower portion of the platform 102. For example, the linkages 128 can connect to the upper rigid body 120 and the lower rigid body 122. In some embodiments, the linkages 128 can be rigid. In some embodiments, the linkages 128 may not be rigid. For example, the linkages 128 can include elastic bands, springs, cables, and so forth. In some embodiments, non-rigid linkages 128 can compress the bladder 110 when a fluid (e.g., a rare fluid) has been removed from the bladder 110. In some embodiments, cables can limit the maximum size of the bladder 110 as it inflates. The linkages 128 can include a combination of components. For example, springs, elastic bands, or both can be used in conjunction with cables, thereby compressing the bladder 110 as fluid is removed while also limited the maximum size of the bladder 110. In some embodiments, standoffs 130 can be used to limit the compression of the bladder 110. Limiting the size of the bladder 110 as it inflates can help to regularize the speed at which the platform 102 will rise. Limiting the size of the bladder 110 as it deflates can help to regularize the speed at which the platform 102 will fall.

Advantageously, it may be possible to modify the design and operation of such a clock to increase the accuracy of the clock to a desired level, similar to how a pendulum clock's accuracy can be improved by increasing the length and mass of the pendulum. For a clock that operates based on buoyancy, accuracy may be increased by extending the time a body spends traveling at constant speed compared to the time the body spends accelerating or turning, which may have greater variability. Thus, greater accuracy can be achieved by increasing the length of travel of the body, such as the distance traveled by the platform 102 of FIG. 1. Greater accuracy can also be achieved by making the buoyant force very small, thereby reducing the terminal velocity of the body and causing the body to take longer to traverse a given distance. Advantageously, reducing the buoyant force on the body can enable increased accuracy without increasing the physical size of a clock. Slow movements may also reduce variability at the turning points as the body is less likely to bounce or deform when changing directions.

In some embodiments, a chamber such as the chamber 100 of FIG. 1 may not have sidewalls. However, in some embodiments, it may be advantageous to add sidewalls that partially or fully enclose the chamber, for example to reduce the effects of ocean currents or other turbulence. In some embodiments, a platform such as the platform 102 of FIG. 1 may be free to move both horizontally and vertically. In some cases, however, this may be problematic. For example, if an ocean current, wind, or the like push the platform horizontally during travel, the path length traveled by the platform may be altered and the time taken to traverse the path may change. In some embodiments, guide rails or the like may be used to restrict the platform to vertical travel. In some embodiments deviations in the speed of the platform may be mitigated by reducing turbulence with a hydrodynamic envelope or shell partially enclosing the platform.

Figure 2:
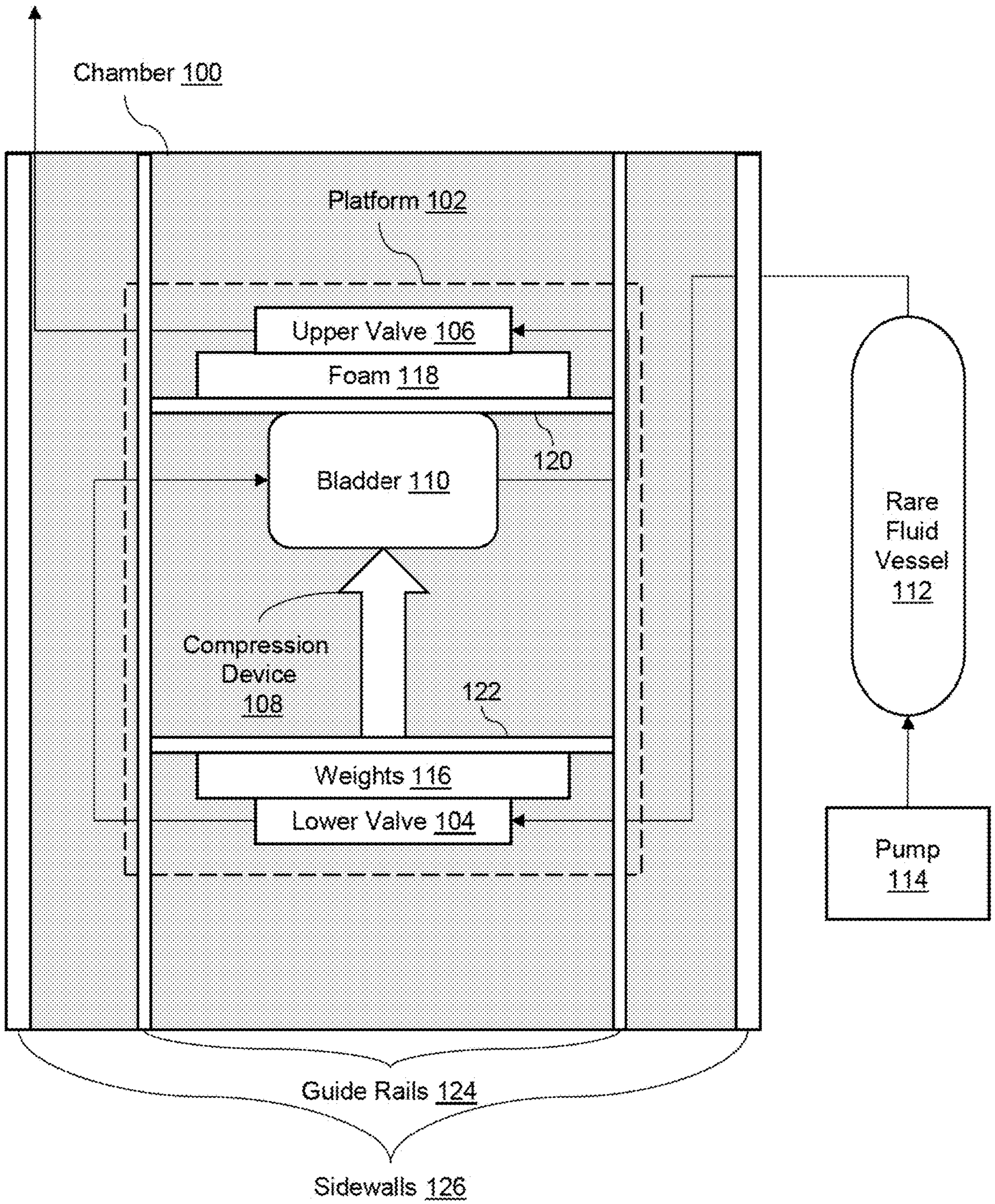
FIG. 2 illustrates another mechanical clock according to some embodiments.

FIG. 2 illustrates another mechanical clock according to some embodiments. The mechanical clock depicted in FIG. 2 is broadly similar to the mechanical clock depicted in FIG. 1. In FIG. 2, the mechanical clock can include one or more guide rails 124. In some embodiments, the mechanical clock can include one or more sidewalls 126. The placement of the one or more guide rails 124 can vary. For example, in some embodiments, the one or more guide rails 124 can be situated outside (e.g., adjacent to) rigid components of the platform 102. In some embodiments, the one or more guide rails 124 can extend through part of the platform 102. For example, holes can be formed (e.g., drilled or punched) in the upper rigid body 120 and lower rigid body 122, and the one or more guide rails 124 can pass through the holes. While not shown explicitly in FIG. 2, it will be appreciated the linkages, standoffs, or both, similar to or the same as the linkages 128 and standoffs 130 of FIG. 1 can be included.

Variations in the time taken for the platform to turn at the top and bottom of the chamber may be reduced by adding damping at the top and/or bottom of the chamber. For example, in some embodiments, rubber, foam, or another suitable material may be added. Timekeeping inaccuracies may also arise from variations in the time it takes for a bladder to fill and empty. Thus, in some embodiments, constant pressure valves may be used to ensure that the bladder is filled and emptied at a fixed rate. The impact of variations in filling time can also be mitigated by choosing a rare fluid that has a much lower density than the surrounding dense fluid, so that the time required to fill the bladder to a level that achieves positive buoyancy is a small fraction of the total cycle time, reducing the influence of pump performance, rare fluid vessel pressure, and so forth. In some embodiments, the rare fluid may have a density of less than about 0.1%, less than about 1%, or less than about 10% the density of the surrounding dense fluid. As discussed above, in some embodiments, the bladder may not be filled with a rare fluid, but may instead be filled with a fluid having a density similar to that of the surrounding dense fluid.

In some embodiments, the lower valve 104 and upper valve 106 can be valves that open and close in response to being pressed against a lower or an upper surface of the chamber 100. In some embodiments, a platform may not be confined to a chamber. For example, the platform 102 of FIG. 1 may be modified such that the lower valve 104 and upper valve 106 are pressure-sensitive valves that open and close based on the pressure exerted upon them by the surrounding dense fluid, rather than opening and closing when pressed against an upper or lower surface of a chamber. In some embodiments, a rare fluid source may be the rare fluid vessel 112 and/or pump 114, but in some embodiments, the rare fluid vessel 112 and/or pump 114 may be omitted. For example, air or another fluid may be pumped into the bladder 110 via a fluid connection to the atmosphere or to another fluid source, or a compressed gas cylinder (which may be, for example, a SCUBA bottle or other compressed gas cylinder) may be used as the rare fluid vessel 112, which can render the pump 114 unnecessary. In some embodiments, the clock may operate entirely immersed in a dense fluid so long as there is sufficient pressurized gas to fill the bladder 110 as the clock operates. In some embodiments, the rare fluid vessel 112 may be regularly recharged by a pump 114. In other cases, the rare fluid vessel 112 may be replaced when the pressure drops below a certain level. In some embodiments, when fed by an external source such as the atmosphere, the clock may operate indefinitely.

In some embodiments, the clock may be affixed with a clock face. For example, a clock face may be attached to the top surface of the chamber 100 of FIG. 1, to the bottom surface of the chamber 100, or to the platform 102, and the face movement may be controlled by a valve or switch that activates when the platform 102 reaches the top and/or bottom of its travel path.

Figure 3:
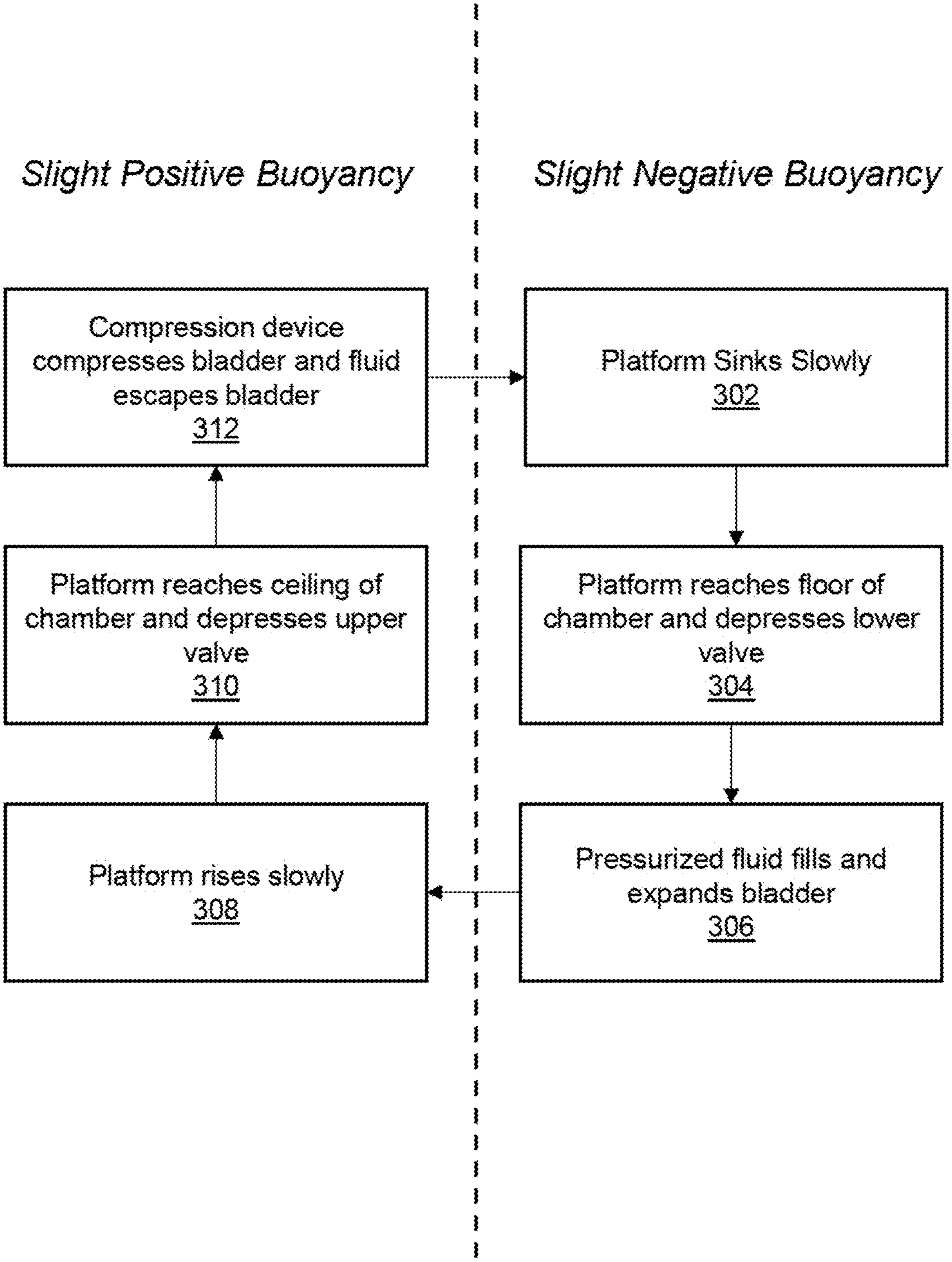
FIG. 3 illustrates an example process for operating a mechanical clock according to some embodiments.

FIG. 3 shows an example sequence for carrying out a periodic timekeeping process according to some embodiments. At block 302, starting with a slightly negatively buoyant platform (for example, the platform 102 of FIG. 1 when the bladder 110 is not filled with rare fluid) can move at an approximately constant velocity toward the bottom of a chamber. At block 304, when the platform reaches the bottom of the chamber, the weight of the platform can cause a lower valve (for example, lower valve 104) to open. At block 306, rare fluid can flow into a bladder of the platform by way of the lower valve. The bladder may expand in response to the flow of rare fluid into the bladder, thereby causing the density of the platform to decrease and resulting in the platform becoming slightly positively buoyant. At block 308, the slightly positively buoyant platform can rise slowly and at an approximately constant velocity toward the top of the chamber. As the platform moves away from the bottom of the chamber, the lower valve can be closed such that additional rare fluid cannot flow into the bladder. At block 310, upon reaching the top of the chamber, an upper valve can be depressed. At block 312, rare fluid may flow out of the bladder with the aid of a compression device, such as a spring, elastic, or other suitable compressible material. As the rare fluid flows out of the bladder, the density of the platform can increase and the platform can become slightly negatively buoyant and can begin to sink, which can release and close the upper valve. In some embodiments, the process can repeat any number of iterations.

Figure 4:
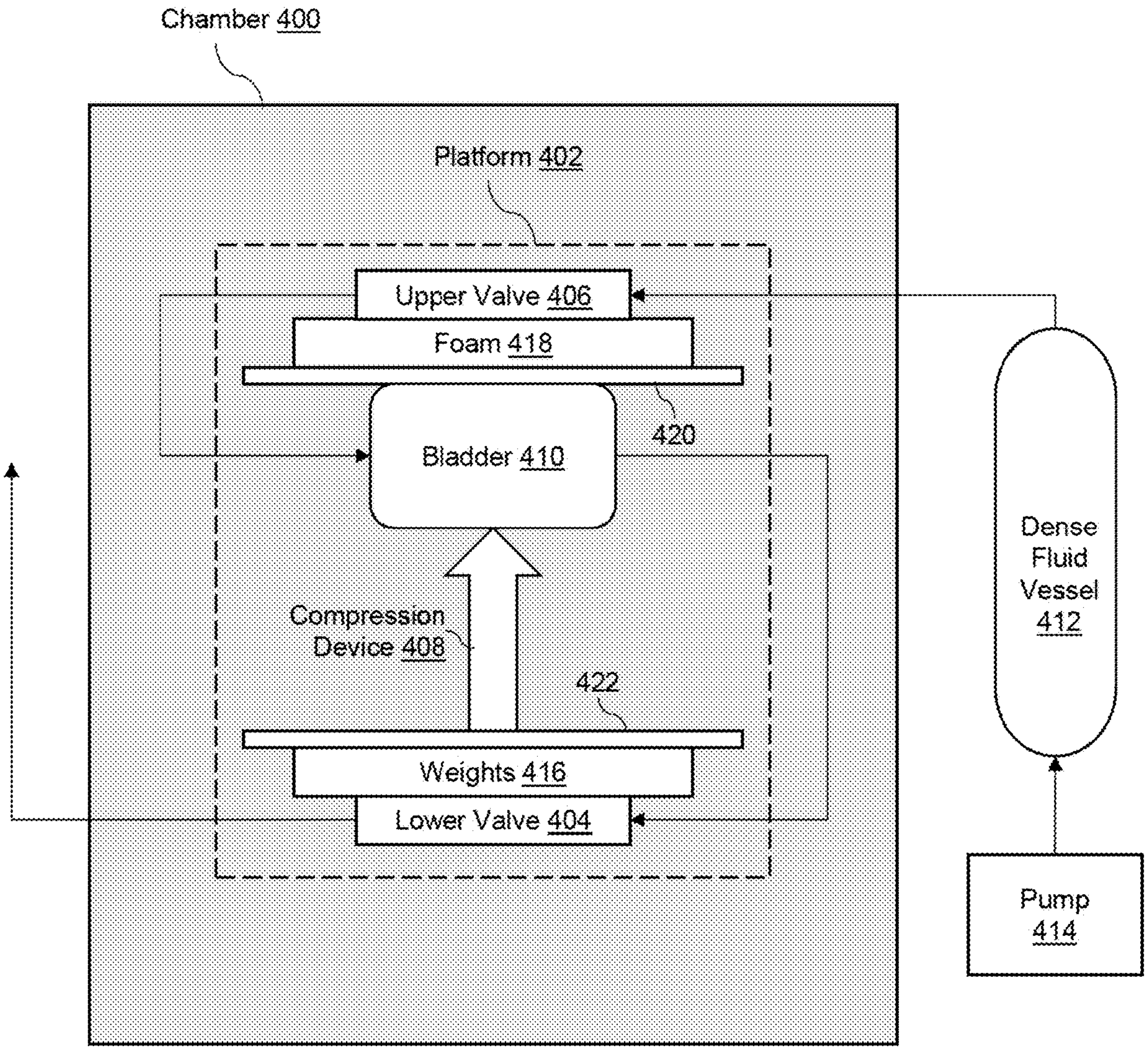
FIG. 4 illustrates a mechanical clock that may be used in fluids according to some embodiments.

The examples above illustrate operation that uses a fluid that is less dense than the surrounding fluid to fill a bladder. It can also be possible to operate a clock designed according to such principles by filling a bladder with a dense fluid, as depicted in FIG. 4. The platform 402 depicted in FIG. 4 can be broadly similar to the platforms depicted in FIGS. 1 and 2, with appropriate modifications to the design to facilitate use of a fluid that is denser than the surrounding fluid. Such a design may be achieved by constructing a platform 402 that is less dense than the fluid in chamber 400. The platform 402 can include an upper valve 406, in fluid communication with dense fluid vessel 412 and pump 414, which can be external to the platform 402. The upper valve 406 can be in fluid communication with a bladder 410, which may be compressed by the compression device 408, which may be, for example, a spring, compressible foam, and so forth. The bladder 410 can be in fluid communication with a lower valve 404 which, when open, can allow fluid to escape the bladder 410. The platform may optionally be fitted with foam 418 (or another suitable low density material) and/or weights 416 to achieve a desired buoyancy of the platform 402. The platform can include an upper rigid body 420 and a lower rigid body 422, which can be similar to or the same as the upper rigid body 120 and lower rigid body 122.

It will be appreciated that the clock of FIG. 4 can include additional features, such as any combination of one or more of guide rails, linkages, or standoffs, which may be similar to or the same as the linkages 128 and standoffs 130 shown in FIG. 1 or the one or more guide rails 124 shown in FIG. 2. The chamber 400 can include one or more sidewalls which may be the same as or similar to the one or more sidewalls 126 shown in FIG. 2. Applying any of all of these additional features can improve the accuracy of a clock designed according to FIG. 4.

Figure 5:
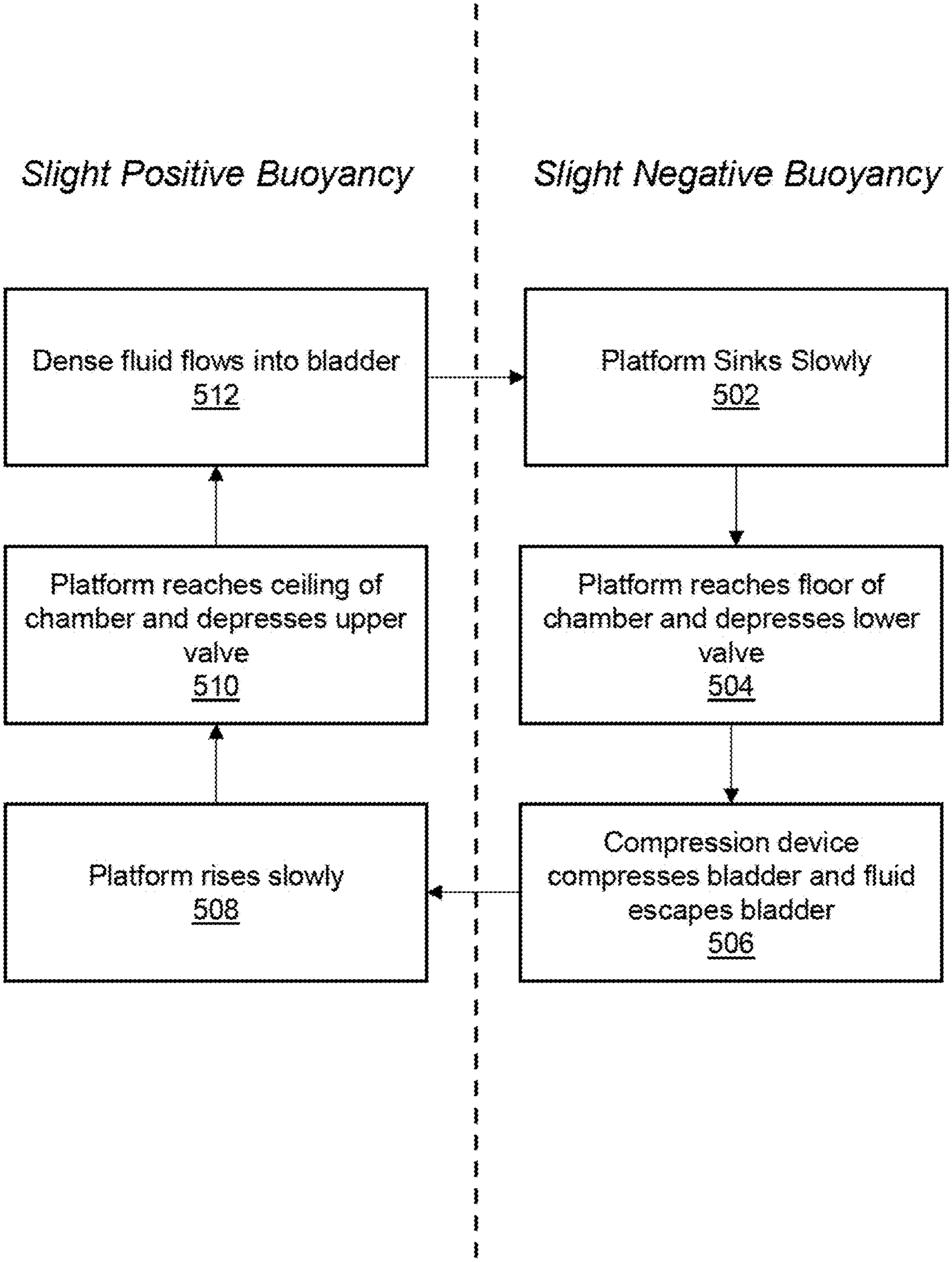
FIG. 5 illustrates an example process for operating a mechanical clock according to some embodiments.

FIG. 5 shows an example sequence for carrying out a periodic timekeeping process according to some embodiments. At block 502, starting with a slightly negatively buoyant platform (for example, the platform 402 when the bladder 410 is filled with a dense fluid) can move at an approximately constant velocity toward the bottom of a chamber. At block 504, when the platform reaches the bottom of the chamber, the weight of the platform can cause a lower valve (for example, lower valve 404) to open. At block 506, dense fluid can be released from the bladder, aided by a compression device such as a spring or other elastic material, which can cause the platform to become slightly positively buoyant. At block 508, the slightly positively buoyant platform can rise slowly and at an approximately constant velocity toward the top of the chamber. As the platform moves away from the bottom of the chamber, the lower valve can close. At block 510, upon reaching the top of the chamber, an upper valve can be depressed. At block 512, dense fluid can flow into the bladder. As the dense fluid flows into the bladder, the density of the platform can increase and the platform can become slightly negatively buoyant and begins to sink, which can release and close the upper valve. In some embodiments, the process can repeat any number of iterations.

In some embodiments, instead of using a fluid to change the density of the platform, solid objects with greater density than the environmental medium may be loaded on and off of the platform, for example by using a conveyor belt rather than one-way valves. For example, a conveyor belt can be activated when an upper switch is activated, thereby enabling a solid object to be loaded onto the platform. The conveyor belt can be activated when a lower switch is activated, thereby enabling the removal of the solid object onto the platform.

In some embodiments, multiple conveyor belts can be used. For example, a first conveyor belt can be activated when an upper switch is activated, which can load a solid object (e.g., a rock, brick, metal weight, and so forth) onto the platform, and a second conveyor belt can be activated when a lower switch is activated, which can remove the solid object from the platform. In some embodiments, more than one solid object may be loaded onto or off of the platform.

Figure 6:
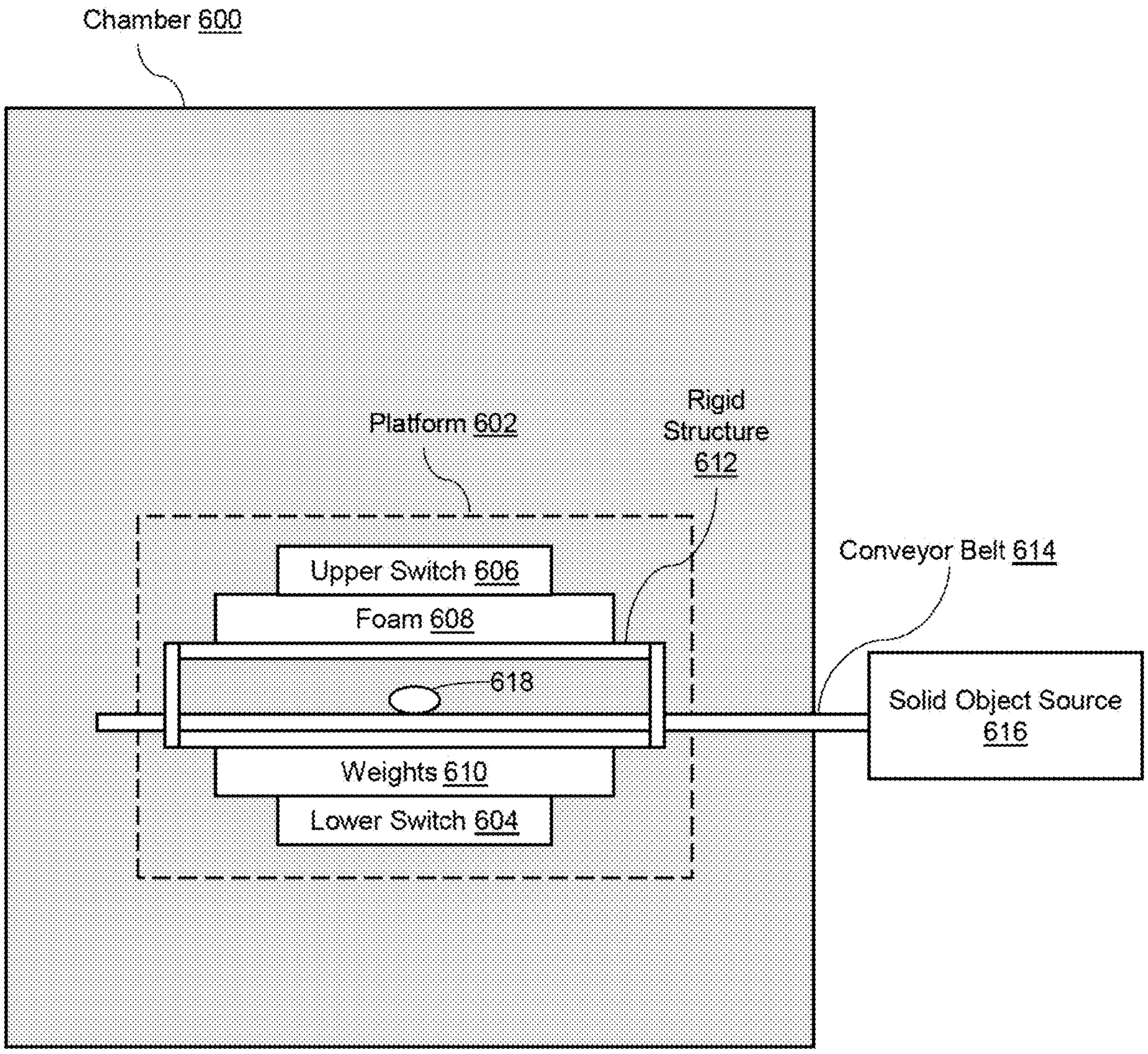
FIG. 6 illustrates another example clock according to some embodiments.

FIG. 6 illustrates an example clock according to some embodiments. The clock depicted in FIG. 6 can use solid objects to adjust the buoyancy of a platform. As shown in FIG. 6, a platform 602 can be disposed in a chamber 600. The platform 602 can include a lower switch 604 and an upper switch 606. The platform 602 can include a rigid structure 612. The platform 602 can include foam 608, weights 610, or both to adjust the buoyancy of the platform 602. A conveyor belt 614 can be affixed to the platform 602 (e.g., affixed to the rigid structure 612) and connected to a solid object source 616. When active, the conveyor belt 614 can transport a solid object 618 onto or off of the platform 602.

The example clock illustrated in FIG. 6 can be modified as described above. For example, a chamber may not be present, and the switches can be, for example, pressure switches that activate based on the pressure of the surrounding fluid on the switch. In some embodiments, one or more chambers walls may be present. In some embodiments, the conveyor belt may be unprotected from the environment. in some embodiments, the conveyor belt may be surrounded on or more sides, for example to prevent the solid object from inadvertently falling off the conveyor belt, for example as a result of turbulence or motions of the platform 602.

In some embodiments, rather than having a single platform that moves vertically, multiple platforms may be arranged about the edge of a wheel, and the torque on the wheel may be generated by the positive and negative buoyancy of the multiple platforms, which may be filled and emptied in sequence, based on their angular position and velocity. This arrangement may mitigate the error that can arise due to the sudden change of direction of the platform that occurs in the vertical model.

In the foregoing specification, the systems and processes have been described with reference to specific embodiments thereof. It will, however, be evident that various modifications and changes may be made thereto without departing from the broader spirit and scope of the embodiments disclosed herein. The specification and drawings are, accordingly, to be regarded in an illustrative rather than restrictive sense.

Indeed, although the systems and processes have been disclosed in the context of certain embodiments and examples, it will be understood by those skilled in the art that the various embodiments of the systems and processes extend beyond the specifically disclosed embodiments to other alternative embodiments and/or uses of the systems and processes and obvious modifications and equivalents thereof. In addition, while several variations of the embodiments of the systems and processes have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the disclosure. It should be understood that various features and aspects of the disclosed embodiments can be combined with, or substituted for, one another in order to form varying modes of the embodiments of the disclosed systems and processes. Any methods disclosed herein need not be performed in the order recited. Thus, it is intended that the scope of the systems and processes herein disclosed should not be limited by the particular embodiments described above.

It will be appreciated that the systems and methods of the disclosure each have several innovative aspects, no single one of which is solely responsible or required for the desirable attributes disclosed herein. The various features and processes described above may be used independently of one another or may be combined in various ways. All possible combinations and sub-combinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination. No single feature or group of features is necessary or indispensable to each and every embodiment.

It will also be appreciated that conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one or more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Further, while the methods and devices described herein may be susceptible to various modifications and alternative forms, specific examples thereof have been shown in the drawings and are herein described in detail. It should be understood, however, that the embodiments are not to be limited to the particular forms or methods disclosed, but, to the contrary, the embodiments are to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (for example, as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (for example, as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present. The headings provided herein, if any, are for convenience only and do not necessarily affect the scope or meaning of the devices and methods disclosed herein.

Accordingly, the claims are not intended to be limited to the embodiments shown herein but are to be accorded the widest scope consistent with this disclosure, the principles and the novel features disclosed herein.

What is claimed is:

1. A mechanical clock comprising:
- a platform comprising:
  - a bladder;
  - a lower valve;
  - an upper valve; and
  - a compression device,
  - wherein the lower valve is in fluid communication with the bladder and a first fluid source,
  - wherein the first fluid source comprises a first fluid,
  - wherein the bladder is in fluid communication with the lower valve,
  - wherein the upper valve is in fluid communication with the bladder, and
  - wherein the compression device is in contact with the bladder.

2. The mechanical clock of claim 1, further comprising a chamber comprising:
- one or more sides;
- an upper surface; and
- a lower surface,
- and wherein the platform is disposed within the chamber.

3. The mechanical clock of claim 2, wherein the one or more sides of the chamber are at least partially enclosed.

4. The mechanical clock of claim 2, wherein the upper valve is configured to open when the upper valve is in contact with the upper surface of the chamber, and wherein the lower valve is configured to open when the lower valve is in contact with the lower surface of the chamber.

5. The mechanical clock of claim 1, wherein the first fluid source comprises a first fluid vessel.

6. The mechanical clock of claim 1, wherein the first fluid source comprises a pressurized vessel.

7. The mechanical clock of claim 1, wherein the first fluid source comprises a pump.

8. The mechanical clock of claim 1, wherein the lower valve and the upper valve are constant flow valves.

9. The mechanical clock of claim 1, wherein the lower valve and upper valve are manually operated valves.

10. The mechanical clock of claim 1, wherein the lower valve and upper valve are pressure-sensitive valves.

11. The mechanical clock of claim 1, wherein the platform is mechanically coupled to one or more guide rails, wherein the one or more guide rails limit horizontal motion of the platform.

12. The mechanical clock of claim 1, wherein the platform is negatively buoyant with respect to a second fluid in which the platform is placed.

13. The mechanical clock of claim 1, wherein the first fluid comprises air.

14. The mechanical clock of claim 1, further comprising an indicator of an amount of elapsed time.

15. The mechanical clock of claim 14, wherein the indicator is a display of elapsed time or current time.

16. The mechanical clock of claim 1, wherein the platform is submerged in a second fluid, wherein the second fluid has a higher density than the first fluid.

17. The mechanical clock of claim 16, wherein the second fluid comprises water and the first fluid comprises air.

18. A method of keeping time, the method comprising:
- flowing a first fluid into a bladder forming part of a platform and mechanically and fluidly coupled to a first valve and a second valve, wherein flowing the first fluid makes the platform positively buoyant;

automatically opening the first valve when the bladder reaches a first height, wherein opening the first valve causes the first fluid to escape from the bladder, and wherein the first fluid escaping from the bladder causes the platform to become negatively buoyant;

once the platform has become negatively buoyant, automatically closing the first valve;

automatically opening the second valve when the bladder reaches a second height, wherein opening the second valve causes the first fluid to fill the bladder, and wherein the first fluid filling the bladder causes the platform to become positively buoyant; and once the platform has become positively buoyant, automatically closing the second valve.

19. The method of claim 18, wherein automatically opening the first valve, automatically closing the first valve, automatically opening the second valve, and automatically closing the second valve are repeated for a plurality of iterations.

20. The mechanical clock of claim 16, wherein a density of the first fluid is one tenth a density of the second fluid.

* * * * *